United States Patent [19]

Miller et al.

[11] Patent Number: 5,863,858
[45] Date of Patent: Jan. 26, 1999

[54] SHAPED LIGNOCELLULOSIC-BASED ACTIVATED CARBON

[75] Inventors: James R. Miller, Mt. Pleasant, S.C.; Robert K. Beckler, Lexington, Va.; Jane F. Byrne, Mt. Pleasant; Robert C. Flowe, Johns Island, both of S.C.; David E. Sauriol, Covington, Va.; Zhiquan Quentin Yan, Mt. Pleasant, S.C.

[73] Assignee: Westvaco Corporation, New York, N.Y.

[21] Appl. No.: 609,632

[22] Filed: Mar. 12, 1996

[51] Int. Cl.⁶ ....................................... B01J 20/10
[52] U.S. Cl. ........................... 502/411; 502/180; 502/184
[58] Field of Search ............................... 23/314; 502/180, 502/182, 183, 184, 411, 427; 264/15, 70

[56] References Cited

U.S. PATENT DOCUMENTS 4,677,086  6/1987  McCue et al. ........................... 502/413
5,073,454  12/1991  Graham ..................................... 502/56
5,691,270  11/1997  Miller ....................................... 502/423

*Primary Examiner*—Michael L. Lewis
*Assistant Examiner*—Stuart L. Henderickson
*Attorney, Agent, or Firm*—Terry B. McDaniel; Daniel B. Reece, IV; Richard L. Schmalz

[57] ABSTRACT

Extruded pellets comprising a majority of activated carbon particles and an inorganic binder are disclosed to provide improved performance when processed through tumbling equipment while the pellets are in their "green" state (i.e., pellets which are fresh off the extruder and contain activated carbon), binder material, and water and have not been subjected to any thermal processing (drying or calcining). The tumbling action both smooths and densifies (i.e., reduces interparticle voids within) the pellet, thereby closing any cracks and greatly improving appearance. Improved performance results from an ability to increase the weight of carbon pellets which can be packed into a fixed volume and thereby increase the volumetric working capacity of the bed for adsorbing/desorbing vapors. Another benefit is to greatly reduce the levels of dust associated with the carbon, both the initial dust and the dust attrition.

20 Claims, 2 Drawing Sheets

5,863,858

SHAPED LIGNOCELLULOSIC-BASED ACTIVATED CARBON

BACKGROUND OF THE INVENTION

1. Field of the Invention

This invention relates to an active carbon pellet prepared by extruding activated lignocellulosic-based carbon with a binder material. More particularly, the invention relates to an improved active carbon pellet characterized by low pellet void volume and low dust attrition.

2. Description of the Prior Art

Granular carbons and carbon pellets are typically used in columns or beds for gas and vapor systems as well as for processing a number of liquids. Such carbons have been used in canisters in automobiles through which gasoline tank and carburetor vapors are directed prior to release to the environment. To qualify for this application, a carbon must possess sufficient mechanical strength to withstand the abrasion incident to continued use.

There generally is a direct correlation between the mechanical strength of the granular activated carbon product and the mechanical strength of its precursor raw material. Thus, coal-based active carbon generally exhibits a high mechanical strength and density; whereas, lignocellulosic-based active carbons, derived from a much "softer" precursor relative to coal, generally exhibit low mechanical strengths and densities.

Also, gas-adsorbing carbons should be as dense as is consistent with high adsorption capacity so as not to require a large space for the adsorber. The development of high adsorption capacity during thermal activation, however, is accompanied by a loss of mechanical strength and density; therefore, some compromise is required in selecting the degree to which the activation is conducted. So, with lignocellulosic precursors (or, for lignocellulosic-based active carbons), the problem is compounded.

Several approaches have been taken to address the problem of low mechanical strength and density of lignocellulosic-based active carbons. In U.S. Pat. No. 3,864,277, Kovach emphasizes the binder additive in teaching the phosphoric acid activation of wood, straw, or low-rank brown coals in the presence of a carbonaceous binder material such as lignosulfonates and polyvinyl alcohol, followed by forming solid granular shaped particles from the mixture, and heat-treating at less than 650° C. to give a granular product having a ball-pan hardness of greater than 85%. Given the teaching of Kovach and employing the knowledge of the relationship of precursor mechanical strength and density with those characteristics of the active carbon product, MacDowall (in U.S. Pat. No. 5,162,286) teaches increasing lignocellulosic-based active carbon density by the use of young carbonaceous vegetable products high (>30%) in natural binding agent, such as nut shell, fruit stone, almond shell, and coconut shell, as precursors for treatment with phosphoric acid followed by carbonization.

A third approach, which relates to the present invention, is taught by McCue et al. in U.S. Pat. No. 4,677,086. To achieve, in a wood-based active carbon, the mechanical strength and product density approaching that achieved with coal-based products, McCue et al. teach extruding an active wood-based carbon with bentonite clay, followed by calcining the extruded active carbon/clay pellets. This technology has been the basis for the commercial products NUCHAR® BAX-950 and NUCHAR® BAX-1100 marketed by Westvaco Corporation.

Carbons of suitable mechanical strength and density for use in an evaporative emission control device (automotive canister) for adsorbing gasoline vapors preferably also exhibit a butane working capacity of about 10 to about 17 g/100 cc and an apparent density from about 0.25 to about 0.40 g/cc.

In addition to gas column (or, packed bed) requirements for high mechanical strength and high density, it is also desirable to reduce the bed void volume in order to maximize the carbon content of the bed, and subsequently maximize the adsorptive capacity. This is primarily determined by the shape of the granular or pelleted carbon. In fact, because of the irregular shape of granular carbon, more regularly shaped carbon pellets are preferred for their better "packing." However, as a result of uneven cutting of the extrudate to form the pellets, the pellets are, in fact, irregularly shaped, and fissures and cavities often appear along the pellet surface. This creates two problems. The resulting irregularities in shape prevent optimization of bed (or column) packing and detract from maximizing the carbon content for a given pellet volume. In addition, the surface irregularities are often removed from the pellet due to abrasion. These material losses, in addition to debris caused by cutting the pellets to size, present another problem: dust. Typically, dusting due to abrasion, or dust attrition, may be retarded or precluded by spraying a coating on the surface of the pellet. Invariably, this remedy is at the expense of butane working capacity; thereby providing another trade-off for the working life of the active carbon material.

Besides having a product which may appear to disintegrate, attrited dust in a packed bed, such as a column or an automotive canister can fill the bed voids to create high pressure drops and impede the flow-through of vapors to be treated. A particular problem in the automotive application is concern that the dust will act to interfere with various sensing devices connected to the canister to monitor performance, resulting either in false readings or in failure of the sensing devices altogether.

Therefore, an object of this invention is to provide an improved lignocellulosic-based activated carbon pellet of a smoother surface and more uniform shape which provides optimal bed packing, exhibits increased density, and is less susceptible to dust attrition. An additional object of this invention is to provide an improved method of manufacture of such activated carbon pellet.

SUMMARY OF THE INVENTION

Figure 1:
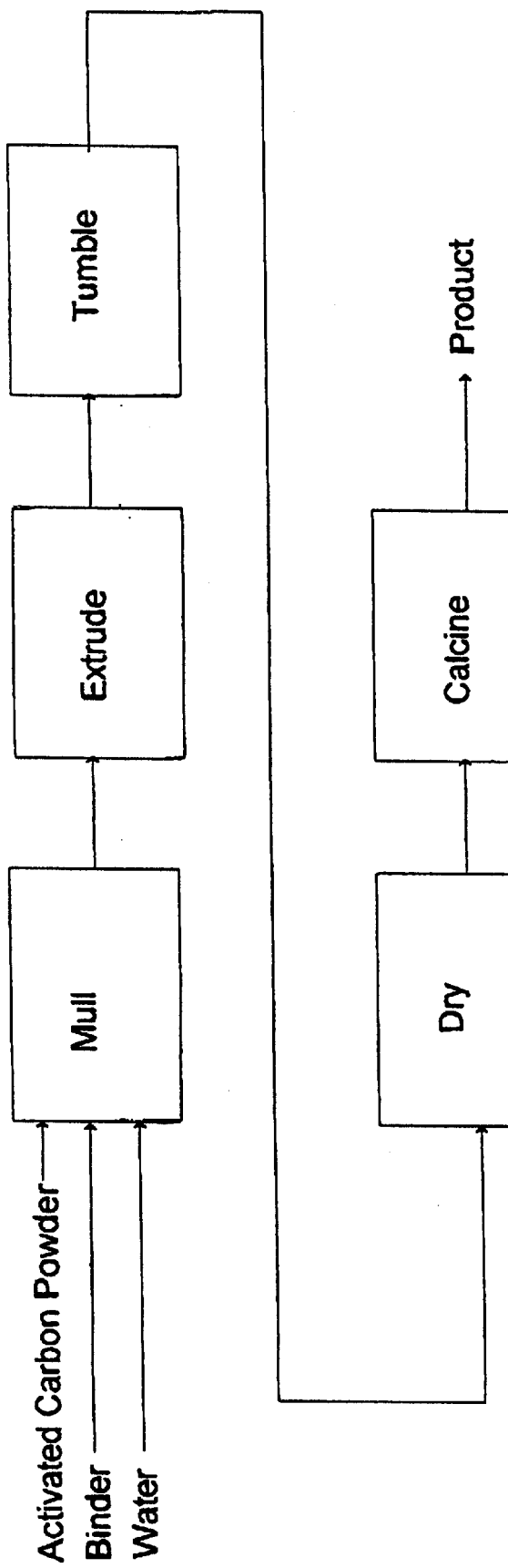
FIG. 1 shows a block flow diagram of the invention process wherein tumbling is carried out on the green extrudate, followed by drying and calcination.
Figure 2:
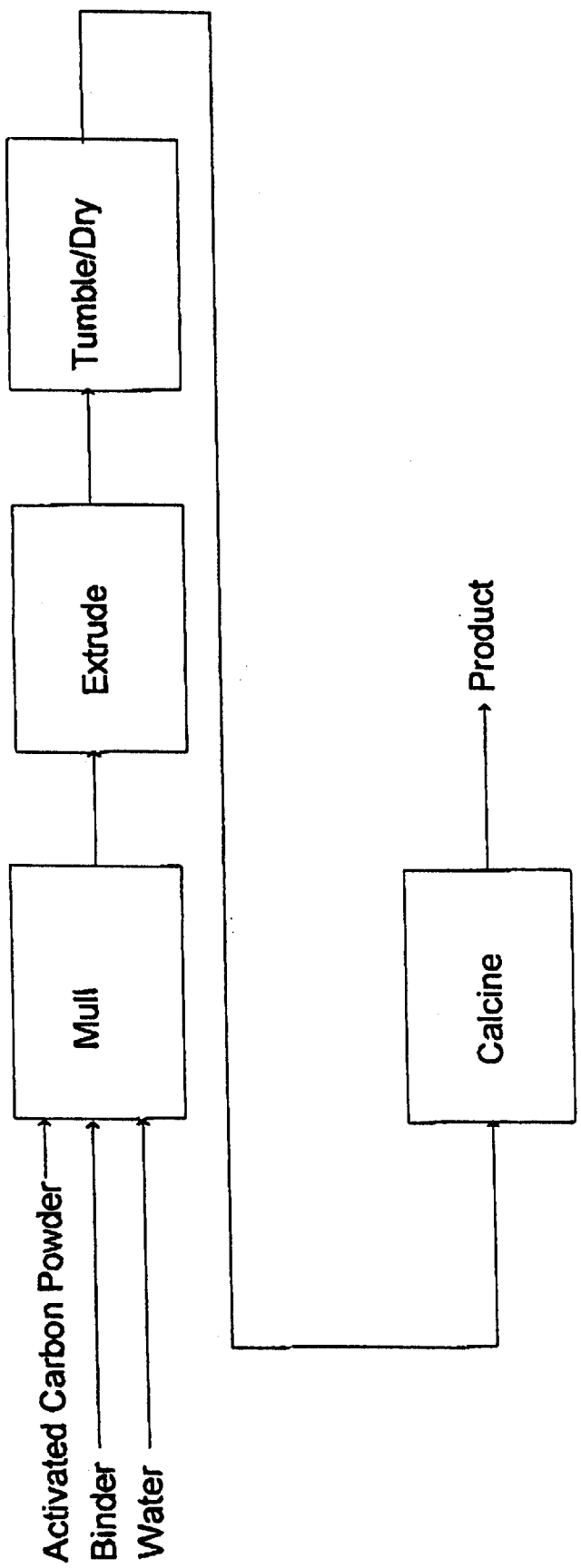
FIG. 2 shows a block flow diagram of the invention process whereby tumbling is carried out on the green extrudate as it is being dried, followed by calcination.

The object of the invention is achieved in the discovery that extruded pellets comprising a major portion of activated carbon particles and a minor portion of inorganic or organic binder provides improved performance when processed through tumbling equipment while the pellets are in their "green" state. Green pellets are those which are fresh off the extruder and contain activated carbon, binder, and moisture (from 50–70% water, by weight) and have not been subjected to any thermal processing (i.e., drying or calcining). The tumbling action both smooths and densifies (i.e., reduces interparticle voids within) the pellet, thereby sealing, or otherwise closing, any cracks and greatly improving appearance. (Interestingly, debris caused by cutting the pellets to size is assimilated by the tumbling pellets.) Improved performance results from an ability to increase the weight of carbon pellets which can be packed into a fixed volume and thereby increase the volumetric working capacity of the bed for adsorbing/desorbing vapors. Another benefit is to greatly reduce the levels of dust associated with the carbon, both the initial dust and the dust attrition.

DESCRIPTION OF THE PREFERRED EMBODIMENT(S)

The process steps for the alternative embodiments of the invention process are set forth in the drawings. The process steps are described in greater detail in the Examples which follow. Also, with the exception of the invention improvement, the process generally follows the teaching of U.S. Pat. No. 4.677,086, which disclosure is incorporated herein by reference. Basically, the blend of activated lignocellulosic-based carbon, binder material, and water are mixed and then fed through an extrusion device. The generally continuous extrudate is cut at consistent intervals to produce a cylindrical pellet, relatively uniform in length and diameter. The invention process improvement involves taking these "green" pellets soon after they are generated and subjecting them to a tumbling process for a period of time sufficient to produce a pellet that, upon subsequent drying and/or calcination, exhibits a pellet void fraction of less than 0.19 (determined as the actual pellet density divided by the base pellet density and subtracted from 1) and a dust attrition rate of less than 1.2 mg/100 cc/minute. In a preferred embodiment of the invention composition, the pellet void fraction is less than 0.17 and the dust attrition rate is 1.0 mg/100 cc/minute. In particular, it has been found that the tumbling step is effective to provide the improved composition of the invention if it is performed in lieu of immediately drying the green pellets in additional equipment.

It is envisioned that the moisture level of the green pellets is important in the effectiveness of the tumbling step, and that a critical moisture level may exist below which densification and reduction of dust levels may not occur. As a result, in an additional embodiment of the invention, the tumbling equipment can also be used to dry the green pellets, if the drying rate is kept to a level low enough to give a sufficient residence time before the critical moisture level is reached. The critical moisture level is in the range of 50–70% water, by weight A preferred moisture level is 55–65% water, by weight. The most preferred moisture level for the tumbling operation of the green pellets is 58–62% water, by weight.

Any commercial tumbling equipment, based on the nature and volume of material to be treated, is considered suitable for use in the invention process. Also, the process may conducted as a batch or continuous process, which may dictate the particular equipment employed. In a batch process, preferred tumbling equipment includes a disc pan pelletizer and a rotating drum, as employed in the examples below. In a continuous process preferred tumbling equipment includes a continuous rotary tumbling device, such as an adapted Munson blender (originally used for mixing/ blending), and a vibrating/spiral screening device, such as made by Sweco. Any equipment which would be expected to produce the benefits of the invention process and to produce the invention composition are considered equivalent thereto. The tumbling operation may be employed for up to 30 minutes. The process is considered to offer little or no benefit once the moisture level in the pellets is significantly reduced.

After the tumbling operation, the pellets are subjected to drying temperatures up to 700° F. (370° C.) for a time sufficient to removing the moisture therefrom. (At temperatures above 500° F. (260° C.), heating should be conducted in an inert atmosphere to avoid ignition of the carbon.) Preferably, the drying step is conducted from about 250° F. (120° C.) to about 500° F. for from about 0.5 to about 5 hours. Following the drying step, the dried active carbon pellet may be heat treated at temperatures from about 700° F. to about 1800° F. (982° C.) for a time sufficient to calcine, or fix, the clay binder. Preferably, the calcination step is conducted from about 1000° F. (538° C.) to about 1300° F. (705° C.).

The lignocellulosic material precursor to the lignocellulosic-based active carbon used in the invention process to form the invention composition is selected from the group consisting of wood chips, wood flour, sawdust, coconut shell, nut shells, fruit pits, kernal, olive stone, and almond shell.

The binder materials include bentonite clays or chemically modified bentonite clays. Preferred binders are sodium bentonite and calcium bentonite.

In the Examples to follow, the various analyses were performed in measurements determining the benefits of the invention product and process Apparent Density (AD)-ISO No. 960-050: weight of dry carbon per unit volume of the carbon bed Butane Working Capacity (BWC)-ISO No. 960-080: weight of butane purged from a sample of dried carbon after it had been saturated with butane per unit volume of the carbon bed;

Dusting Attrition (DA)-ISO No. 960-380: weight of dust attrited from a 100 ml sample of carbon per unit time;

Initial Dust (ID)-same as dusting attrition: weight of dust initially present on a 100 ml sample of carbon prior to attrition test;

Actual Pellet Density (APD); weight of dry carbon per unit volume of entire carbon pellet. Determined using mercury porosimetry;

Base Pellet Density (BPD); weight of dry carbon per unit volume of carbon pellet including only pore space less than 0.5 microns equivalent diameter. Determined using mercury porosimetry;

Bed Void Fraction (BVF): volume of space between carbon pellets per unit volume of carbon bed. Determined by the equation 1-(AD/APD); and Pellet Void Fraction (PVF)(pellet interparticle void fraction): volume of space within a carbon pellet including only pore space greater than 0.5 microns equivalent diameter per unit volume of entire carbon pellet. Determined by the equation 1-(APD/BPD).

The invention process and composition are farther described in the following specific examples:

EXAMPLE 1

Ground wood-based activated carbon was mixed with bentonite clay and water in a muller mixer. The dry basis clay concentration was 14 wt %. The mixture was mulled until it reached a consistency which could be extruded. It was extruded in a twin screw auger extruder through a die plate containing 2 mm holes and cut as it exited the die plate into "green" pellets ranging in length from 2–6 mm. The green pellets had a moisture content of approximately 55–60 wt % (wet basis). Following extrusion, a portion of the green pellets was loaded into a rotating disc pan pelletizer in order to tumble the pellets. The pan was angled above the horizontal to retain the pellets and rotated at 15 rpm for 5 minutes. After 5 minutes, pellets were collected from the pan and dried in a batch, convection oven. The portion of green pellets which was not tumbled was also dried in the same oven for the same amount of time. The two batches of dried pellets were calcined separately to 1200° F. in a batch indirect-fired rotary furnace for 15 minutes. Following calcination, they were discharged and cooled separately under a nitrogen purge prior to analysis.

The pertinent properties of each product are shown in Table I. From the data, it can be seen that BWC increased 7.5%, apparent density increased 9.2%, initial dust was reduced by 70%, and dust attrition was reduced by 45% (from 2.16 to 1.19).

TABLE I

| Batch I.D. | BWC (g/100 cc) | AD (g/cc) | ID (mg) | DA (mg/min) |
|---|---|---|---|---|
| C-95-0342 -Not Tumbled- | 10.7 | 0.336 | 58.8 | 2.16 |
| C-95-0343 -Tumbled- | 11.5 | 0.367 | 17.8 | 1.19 |

EXAMPLE 2

Ground lignocellulosic-based activated carbon was mixed with bentonite clay and water in a Muller mixer. The dry basis clay concentration was 9 wt %. The mixture was mulled until it reached a consistency which could be extruded. It was extruded in a single screw auger extruder through a die plate containing 2 mm holes and cut as it exited the die plate into "green" pellets ranging in length from 2–6 mm. The green pellets had a moisture content of approximately 55–60 wt % (wet basis). Following extrusion, a portion of the green pellets was taken and loaded into a 24 inch diameter×19 inch deep rotating drum in order to tumble the pellets. The drum was angled above the horizontal to retain the pellets and rotated at 15 rpm for 5 minutes. After 5 minutes, pellets were collected from the drum and dried in a batch, convection oven. The portion of green pellets which was not tumbled was also dried in the same oven for the same amount of time. The two batches of dried pellets were calcined separately to 1200° F. in a batch indirect-fired rotary furnace for 15 minutes. Following calcination, they were discharged and cooled separately under a nitrogen purge prior to analysis.

The pertinent properties of each product are shown in Table II. From the data, it can be seen that the performance of the carbon pellets improved as in Example 1. Specifically, BWC increased 9.0%, apparent density increased 8.0%, initial dust decreased 74%, and dust attrition decreased 84% (from 2.72 to 0.426).

TABLE II

| Batch I.D. | BWC (g/100 cc) | AD (g/cc) | ID (mg) | DA (mg/min) |
|---|---|---|---|---|
| C-95-0752 -Not Tumbled- | 12.2 | 0.338 | 36.6 | 2.72 |
| C-95-0751 -Tumbled- | 13.3 | 0.365 | 9.44 | 0.426 |

EXAMPLE 3

Ground lignocellulosic-based activated carbon was mixed with bentonite clay and water in a Muller mixer. The dry basis clay concentration was 14 wt %. The mixture was mulled until it reached a consistency which could be extruded. It was extruded in a twin screw auger extruder through a die plate containing 2 mm holes and cut as it exited the die plate into "green" pellets ranging in length from 2–6 mm. The green pellets had a moisture content of approximately 55–60 wt % (wet basis). Following extrusion, the pellets were tumbled through a continuous rotating cylinder. Different tumbling conditions were established by varying feed rate, bed depth, rotational speed, and design of internal flights. The different internals tested included (1) none (smooth wall), (2) longitudinal lifters, and (3) zig-zag lifters. Residence time was measured as the parameters were varied. At each condition, the tumbled pellets were collected from the discharge and dried in a batch, convection oven. The portion of green pellets which was not tumbled was also dried in the same oven for the same amount of time. The two batches of dried pellets were calcined separately to 1200° F. in a batch indirect-fired rotary furnace for 15 minutes. Following calcination, they were discharged and cooled separately under a nitrogen purge prior to analysis.

The pertinent properties of each product are shown in Table III. From the data, it can be seen that there is no advantage of using internal flights and that bed depth is not a factor as dam height is varied from 3 to 5 inches. Additionally, over the conditions tested, residence time did not have a significant impact on BWC, initial dust, or dust attrition improvement. On average, the continuous unit showed that BWC increased 4%, apparent density increased 5%, initial dust was reduced by 69%, and dust attrition was reduced by 73% (to as low as 0.19).

TABLE III

| BATCH ID | FEED RATE (lb/min) | ROTATIONAL SPEED (rpm) | FLIGHT DAM (*) | RESIDENCE TIME (sec) | BWC (g/100 cc) | AD (g/cc) | ID (mg) | DA (mg/min) |
|---|---|---|---|---|---|---|---|---|
| Baseline #1 (no tumble) | | | | | | | | |
| C-95-1042 | N/A | N/A | N/A | N/A | 11.0 | 0.325 | 56.2 | 1.3 |
| Constant feed rate and rotational speed; vary flight design with no dam - compare with baseline #1 | | | | | | | | |
| C-95-1048 | 20 | 16 | zig-zag flights | 90 | 11.6 | 0.333 | 17.3 | 0.6 |
| C-95-1049 | 20 | 16 | zig-zag flights | 70 | 11.4 | 0.328 | 28.5 | 0.7 |

TABLE III-continued

| BATCH ID | FEED RATE (lb/min) | ROTATIONAL SPEED (rpm) | FLIGHT DAM (*) | RESIDENCE TIME (sec) | BWC (g/100 cc) | AD (g/cc) | ID (mg) | DA (mg/min) |
|---|---|---|---|---|---|---|---|---|
| Baseline #2 (no tumble) | | | | | | | | |
| C-95-1054 | N/A | N/A | N/A | N/A | 11.1 | 0.323 | 53.4 | 1.9 |
| Constant rotational speed and bed depth; vary feed rate with no internal flights - compare with baseline #2 | | | | | | | | |
| C-95-1050 | 20 | 16 | 3.5" dam | 127 | 11.6 | 0.342 | 27.4 | 0.2 |
| C-95-1051 | 11 | 16 | 3.5" dam | 248 | 11.4 | 0.343 | 28.4 | 0.3 |
| C-95-1052 | 7 | 16 | 3.5" dam | 280 | 11.7 | 0.343 | 22.8 | 0.6 |
| Baseline #3 (no tumble) | | | | | | | | |
| 1290-R-95 | N/A | N/A | N/A | N/A | 11.0 | 0.330 | 15.0 | 1.28 |
| Constant feed rate and rotational speed; vary depth with no internal flights - compare with baseline #3 | | | | | | | | |
| 1285-R-95 | 21 | 16 | 3" dam | 108 | 11.5 | 0.350 | 1.7 | 0.3 |
| 1287-R-95 | 20 | 16 | 4" dam | 160 | 11.4 | 0.340 | 0.3 | 0.25 |
| 1286-R-95 | 20 | 16 | 5" dam | 223 | 11.5 | 0.350 | 0.6 | 0.19 |

EXAMPLE 4

Ground lignocellulosic-based activated carbon was mixed with bentonite clay and water in a Muller mixer. The dry basis clay concentration was 14 wt. %. The mixture was mulled until it reached a consistency which could be extruded. It was extruded in a twin screw auger extruder through a die plate containing 2 mm holes and cut as it exited the die plate into "green" pellets ranging in length from 2–6 mm. The green pellets had a moisture content of approximately 55–60 wt % (wet basis). Following extrusion, a portion of the green pellets was taken and loaded into a rotating disc pan pelletizer in order to tumble the pellets. The pan was angled above the horizontal to retain the pellets and rotated at 15 rpm. After 5 minutes, pellets were collected from the pan and dried in a batch, convection oven. A portion of green pellets which was not tumbled was also dried in the same oven for the same amount of time. The batches of dried pellets were calcined separately to 1200° F. in a batch indirect-fired rotary furnace for 15 minutes. Following calcination, they were discharged and cooled separately under a nitrogen purge prior to analysis.

The pertinent properties of each product are shown in Table IV. From the data, it can be seen that, on average, BWC increased 6.5%, apparent density increased 11.3%, actual pellet density increased 7.1%, base pellet density stayed virtually constant, pellet void fraction decreased 30%, and bed void fraction decreased 5.3%. The tumbling step resulted in a reduction in individual pellet void fractions for an average reduction from 0.21 to 0.14. Also, the average (of the samples) bed void fraction was reduced from 0.38 to 0.36.

TABLE IV

| Batch I.D. | BWC (g/100 cc) | AD (g/cc) | APD (g/cc) | BPD (g/cc) | PVF | BVF |
|---|---|---|---|---|---|---|
| C-95-0347 Not Tumbled | 10.3 | 0.323 | 0.518 | 0.647 | 0.20 | 0.38 |
| C-95-0349 Not Tumbled | 10.4 | 0.320 | 0.517 | 0.653 | 0.21 | 0.38 |
| C-95-0342 Not Tumbled | 10.7 | 0.336 | 0.543 | 0.667 | 0.19 | 0.38 |
| C-95-0079 | 10.7 | 0.333 | 0.517 | 0.701 | 0.26 | 0.36 |
| Not Tumbled Not Tumbled Average | 10.5 | 0.328 | 0.524 | 0.667 | 0.22 | 0.38 |
| C-95-0350 Tumbled | 11.0 | 0.342 | 0.558 | 0.660 | 0.15 | 0.39 |
| C-95-0343 Tumbled | 11.5 | 0.367 | 0.566 | 0.673 | 0.16 | 0.35 |
| C-95-0344 Tumbled | 11.6 | 0.370 | 0.561 | 0.657 | 0.15 | 0.34 |
| C-95-0351 Tumbled | 11.6 | 0.367 | 0.578 | 0.667 | 0.13 | 0.36 |
| C-95-0352 Tumbled | 11.5 | 0.364 | 0.572 | 0.659 | 0.13 | 0.36 |
| C-95-0353 Tumbled | 11.4 | 0.362 | 0.573 | 0.664 | 0.14 | 0.37 |
| C-95-0354 Tumbled | 11.4 | 0.358 | 0.584 | 0.673 | 0.13 | 0.39 |
| C-95-0345 Tumbled | 11.8 | 0.381 | 0.576 | 0.659 | 0.13 | 0.34 |
| C-95-0346 Tumbled | 11.8 | 0.384 | 0.571 | 0.643 | 0.11 | 0.33 |
| Tumbled Average | 11.5 | 0.366 | 0.571 | 0.662 | 0.14 | 0.36 |

It is noted from the tabular data in the various examples that, in addition to the invention improvements of reduced pellet void volume and reduced dust attrition, the invention carbon pellets exhibit a butane working capacity of from about 10 to about 17 g/100 cc and an apparent density from about 0.25 to about 0.40 g/cc.

As will be appreciated by those skilled in the art, the present invention may be embodied in other specific forms without departing from the spirit or essential attributes thereof; and, accordingly, reference should be male to the appended claims, rather than to the foregoing specification, as indicating the scope of the invention.

What is claimed is:

1. An improved process for preparing an uncoated active carbon pellet comprising the steps of:
    (a) grinding granular activated lignocellulosic-based carbon to a powder;
    (b) mixing a greater amount of the activated lignocellulosic-based carbon powder with a lesser amount of binder material selected from the group consisting of bentonite clays and chemically modified bentonite clays in the presence of water;

(c) extruding the mixture to produce an extrudate which is cut to form green pellets that are characterized by 50–70% moisture content, by weight;

(d) subjecting the pellets to sufficient heat to remove the moisture therefrom to produce dried pellets; and (e) heat treating the dried pellets at from about 700° F. to about 1800° F. in an inert atmosphere for a time sufficient to calcine the binder portion thereof, wherein the improvement comprises subjecting the green pellets of step (c) to a tumbling operation for up to about 30 minutes to result in the dried, heat-treated active carbon pellet being characterized by a pellet void fraction of less than 0.19 and a dust attrition rate less than 1.2 mg/100 cc/minute.

2. The improved process of claim 1 wherein the improvement further comprises conducting the tumbling operation prior to step (d).

3. The improved process of claim 1 wherein the improvement further comprises conducting the tumbling operation concurrently with step (d).

4. The improved process of claim 1 wherein the binder material is selected from the group of bentonite clays consisting of sodium bentonite and calcium bentonite.

5. The improved process of claim 1 comprising from about 5% to about 30%, by weight, binder material.

6. The improved process of claim 1 wherein the active carbon pellet is further characterized by a butane working capacity from about 10 to about 17 g/100 cc and an apparent density from about 0.25 to about 0.40 g/cc.

7. The improved process of claim 1 wherein the active carbon pellet is characterized by a pellet void fraction is less than 0.17 and the dust attrition rate is less than 1.0 mg/100 cc/minute.

8. The improved process of claim 7 wherein the active carbon pellet is characterized by a pellet void fraction is less than 0.15 and the dust attrition rate is less than 0.8 mg/100 cc/minute.

9. The improved process of claim 1 wherein step (d) is conducted up at a temperature up to 700° F.

10. The improved process of claim 9 wherein step (d) is conducted at from about 250° F. to about 500° F. for from about 0.5 to about 5.0 hours.

11. The improved process of claim 1 wherein step (e) is conducted at from about 1000° F. to about 1300° F.

12. The improved process of claim 1 wherein the improvement further comprises conducting the tumbling operation as a batch process.

13. The improved process of claim 1 wherein the improvement further comprises conducting the tumbling operation in a rotating disc pan pelletizer.

14. The improved process of claim 12 wherein the improvement further comprises conducting the tumbling operation in a rotating drum.

15. The improved process of claim 1 wherein the improvement further comprises conducting the tumbling operation as a continuous process.

16. The improved process of claim 15 wherein the improvement further comprises conducting the tumbling operation in a rotating tumbling device.

17. The improved process of claim 15 wherein the improvement further comprises conducting the tumbling operation in a vibrating/spiral screening device.

18. The improved process of claim 1 wherein the green pellets are characterized by 55–65% moisture content, by weight.

19. The improved process of claim 18 wherein the green pellets are characterized by 58–62% moisture content, by weight.

20. The improved process of claim 2 wherein the improvement further comprises conducting the tumbling operation for from 70 seconds to 30 minutes.

* * * * *